Jan. 27, 1959            H. W. LORD            2,871,412
STARTING AND OPERATING CIRCUIT FOR ARC-DISCHARGE DEVICE
Filed July 1, 1957
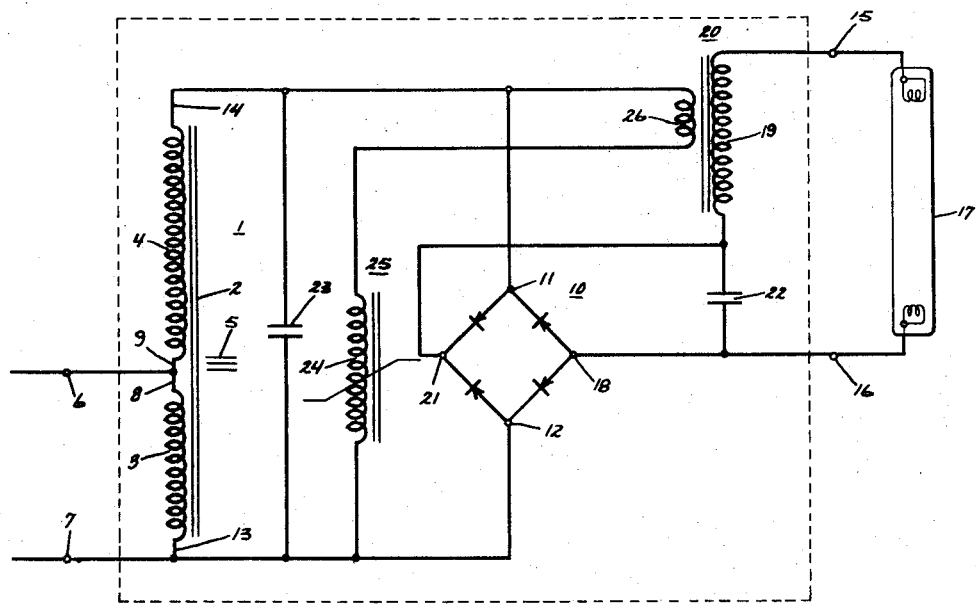
*Inventor:*
*Harold W. Lord,*
*by* *His Attorney.*

United States Patent Office 2,871,412
Patented Jan. 27, 1959

2,871,412

STARTING AND OPERATING CIRCUIT FOR ARC-DISCHARGE DEVICE

Harold W. Lord, Schenectady, N. Y., assignor to General Electric Company, a corporation of New York Application July 1, 1957, Serial No. 669,118

5 Claims. (Cl. 315—205)

This invention relates to circuits for starting and operating arc-discharge devices and more particularly to a circuit for starting and operating an arc-discharge device on direct current from a source of alternating current.

Arc-discharge devices, such as mercury vapor lamps, are used for many purposes, such as indoor and outdoor lighting, photographic printing, etc. When alternating current power is available, these lamps are conventionally started and operated by alternating current circuits; when only direct current power is available, they have been started and operated by direct current circuits. There are applications, however, such as in apparatus for sorting and inspecting punch cards, where the flickerless operation provided by direct current circuits is highly desirable, yet operation from a readily available alternating current source is desired. This requirement naturally dictates a circuit having self-contained rectifying elements providing the direct current output.

It is well known that arc-discharge devices have an inherent negative resistance characteristic; unless means are provided to limit the current to a safe value, the device will destroy itself. In addition, certain types of arc-discharge lamps require a relatively high voltage to strike the arc, i. e., to start, and thereafter operate at rated current at a much lower voltage. A circuit for starting and operating such a lamp must therefore provide not only the elevated starting voltage, but also the current limiting or ballasting action. In the case of alternating current circuits for starting and operating such lamps, this dual requirement is commonly provided by a high reactance step-up transformer having an open circuit secondary voltage sufficient to start the lamp and internal leakage reactance sufficient adequately to limit lamp current. If the circuit is to provide a direct current output, it would superficially appear that it would be merely necessary to interpose a full-wave rectifying and filtering circuit between the output of the transformer and the lamp. Such an arrangement may, in fact, suffice for lamps which do not have a great disparity between their striking and their operating voltages. However, the rectifiers of such circuits must withstand the alternating current open circuit secondary voltage if the lamp fails, and thus in cases where the lamp has a high ratio of starting to running voltage, rectifiers designed to withstand, a voltage much higher than their normal operating voltage must be provided thereby adding substantially to the expense of the circuit. It has therefore been found desirable to provide a circuit for starting and operating arc-discharge devices on direct current from a source of alternating current which provides the requisite elevated starting voltage for the device but in which the rectifiers do not have to withstand the open circuit alternating current voltage.

A circuit which accomplishes the above desirable objectives is described in application Serial No. 630,521, filed December 26, 1956, for John Popa and assigned to the assignee of the present application. In that circuit, rectifying means and an accompanying filter circuit are connected between the alternating current source and the arc-discharge device, the filter circuit including a capacitor and a reactor. Impedance means are provided in the circuit between the source and output for ballasting the arc-discharge device and in order to obtain the requisite starting voltage, another capacitor is provided connected in a modified half-wave voltage doubling circuit with the filter capacitor, the reactor and the rectifying means. This arrangement provides an elevated direct current voltage by voltage doubling action with superimposed alternating current peaks caused by discharge of the additional capacitor through the filter reactor, the combined voltage being sufficient to start the lamp.

While the circuit of the aforementioned Popa application provides the requisite starting voltage for the lamp without necessitating the use of rectifiers which will withstand such voltage, permanent connection of the additional capacitor in the circuit has been found to result in a serious increase in ripple current in the lamp during lamp operation. The aforesaid Popa application discloses the use of a manually-operated push-button to connect the additional capacitor in the circuit only when starting the lamp; with this modified arrangement the additional capacitor is removed from the circuit after the lamp is started thus eliminating the objectionable ripple in the lamp current. It is, however, desirable to provide a circuit for starting and operating an arc-discharge device on direct current from a source of alternating current which provides the advantages of the circuit of the aforesaid Popa application but in which the starting pulses are automatically removed after the lamp is in operation.

It is therefore an object of this invention to provide an improved circuit for starting and operating an arc-discharge device on direct current from a source of alternating current.

Another object of this invention is to provide an improved circuit for starting and operating an arc-discharge device on direct current from a source of alternating current which provides the advantageous features of the circuit of the aforesaid Popa application but which automatically removes the starting pulses after the device is in operation.

Further objects and advantages of this invention will become apparent by reference to the following description and the accompanying drawing, and the features of novelty which characterize this invention will be pointed out with particularity in the claims annexed to and forming a part of this specification.

In my improved circuit, I utilize a non-linear resonant circuit connected across the alternating current input to the rectifying means, which circuit draws a highly peaked current responsive to the open circuit voltage applied to the rectifier and a minimum unpeaked current responsive to the alternating current voltage applied to the rectifier after the device has fired. This invention therefore in its broader aspects provides an alternating current input circuit and a direct current output circuit connected to the lamp with rectifying means interposed between the input and output circuits. Filtering means including a winding of a linear inductor is connected in the circuit between the rectifying means and the arc-discharge device and impedance means is connected in a circuit between the input circuit and the rectifying means for ballasting the arc-discharge device. The alternating current input to the rectifying means is higher than the operating voltage and lower than the starting voltage of the arc-discharge device. A non-linear resonant circuit including a winding of a saturating inductor and an auxiliary winding on the linear inductor is connected in circuit with the input to the rectifying means, the saturating inductor being arranged to be saturated at the open circuit voltage applied to the rectifying means thereby drawing a highly peaked current to the auxiliary winding of the linear inductor and inducing in other winding thereof a highly peaked alternating current voltage which is superimposed upon the direct current output voltage of the rectifier thus providing the elevated voltage for starting the arc-discharge device. After the device is started and the voltage across the input of the rectifying means has been reduced responsive to the ballasting action of the impedance means, the saturating inductor becomes unsaturated and thus draws a minimum peaked current through the auxiliary winding on the linear inductor so that the device essentially operates on the direct current supplied by the rectifying means.

The single figure of the drawing is a schematic illustration of one embodiment of my improved circuit for starting and operating an arc-discharge device on direct current from a source of alternating current.

Referring now to the drawing, my improved starting and operating circuit is shown within the dashed lines and includes a high reactance transformer 1 having a core shown schematically at 2 on which is positioned a primary winding 3 and a secondary winding 4. The core 2 and the primary and secondary windings 3 and 4 are arranged to provide sufficient internal leakage reactance, shown schematically at 5, as is well known in the art. The primary winding 3 is connected across a pair of input terminals 6 and 7, which are adapted to be connected to an external source of alternating current (not shown). The end 8 of primary winding 3 which is connected to input terminal 6 is shown as being connected to end 9 of secondary winding 4 and thus it will be seen that the primary winding 3 and the secondary winding 4 are connected in autotransformer relation, it being understood that the particular transformer connection is not a part of this invention and that an isolated transformer connection may be equally advantageously employed.

A bridge rectifier 10 is provided having its input corners 11 and 12 respectively connected across the other end 13 of primary winding 3 and the other end 14 of secondary winding 4. A pair of direct current output terminals 15 and 16 are provided adapted to be connected to an arc-discharge device 17, such as a mercury vapor lamp. Output terminal 16 is directly connected to output corner 18 of bridge rectifier 10 while main winding 19 of a linear inductor 20 serially connects output terminal 15 and the other output corner 21 of the bridge rectifier 10. A filter capacitor 22 is connected across output corners 18 and 21 of the bridge rectifier 10 and forms a filter circuit for the output of rectifier 10 with winding 19 of linear inductor 20. The transformer 1 is arranged to provide a sufficient open circuit voltage across ends 13 and 14 and has sufficient reactance so that bridge rectifier 10 and the filter circuit provide the requisite direct current voltage across output terminals 15 and 16 for operating the lamp 17 at rated lamp current.

In order to provide the requisite elevated voltage for starting lamp 17, a non-linear resonant circuit is provided comprising a capacitor 23 connected across ends 13 and 14 of transformer 1 and a winding 24 of saturating inductor 25 serially connected with auxiliary winding 26 on linear inductor 20 in parallel with capacitor 23.

It will now be recalled that the open circuit voltage across the output of transformer 1 is higher than the operating voltage required to be supplied across output terminals 15 and 16 for operating lamp 17, this open circuit voltage however being insufficient to start the lamp 17. It will also be readily understood that the voltage across the output of transformer 1 drops to a lower value when the lamp 17 is started by virtue of the high reactance construction of transformer 1. It should further be recalled that non-linear resonant circuits are characteristically voltage responsive rather than frequency responsive, i. e., they go into their resonant condition and therefore draw maximum current in response to the application of a predetermined voltage. It will further be recalled that a saturating inductor displays very low impedance when its core is saturated and under these conditions draws a highly peaked current whereas in its unsaturated condition, a saturating inductor displays very high impedance and draws a normal unpeaked current. The saturating inductor 25 is thus arranged to be saturated at the open circuit secondary voltage of transformer 1 and unsaturated at the operating voltage of transformer 1 after the lamp 17 is fired. It is thus seen that when the saturating inductor 25 is saturated in response to the application of the open circuit secondary voltage of transformer 1, by virtue of its low impedance and saturated condition, it will draw a large highly peaked current through auxiliary winding 26 on linear inductor 20. This highly peaked current flowing through winding 26, which is closely coupled to the main winding 19, induces a highly peaked alternating current voltage across winding 19 which is superimposed upon the direct current voltage output of bridge rectifier 10 and thus provides the requisite elevated voltage across output terminals 15 and 16 for starting the lamp 17. After the lamp has started and the output voltage of transformer 1 has fallen to its operating value in response to the flow of load current therethrough, saturating inductor 25 becomes unsaturated and thus by virtue of its high impedance, a minimum current is drawn through the auxiliary winding 26 of linear inductor 20, this current not being highly peaked as was previously the case. The minimum flow of normal wave form current through auxiliary winding 26 of linear inductor 20 when saturating inductor 25 is in its unsaturated condition does not superimpose any appreciable ripple on the direct current for operating the lamp 17 by the rectifier 10.

With my improved circuit for operating a 100 watt vapor lamp of the type requiring direct current starting voltage in excess of 700 volts and which operates at rated current at 100 volts direct current, the open circuit secondary voltage of transformer 1 may be on the order of 250 volts and the secondary voltage after the lamp has fired will be on the order of 130 volts. The filter capacitor 22 in such a circuit may have a value of 40 microfarads and the linear inductor 20 may have an inductance of 2.12 henries. The capacitor 23 of the non-linear resonant circuit may have a capacitance of 2 microfarads and the saturating inductor 25 may have a saturated inductance of 2.7 henries and an unsaturated inductance of 17.2 henries. With this circuit, the saturating inductor 25 may be designed to operate into the saturation region of its core material when the voltage applied to its winding 24 is in excess of about 200 volts but well below the knee of its magnetization curve when the operating secondary voltage of 130 volts is applied.

It will now be seen that I have provided a circuit for starting and operating an arc-discharge device on direct current from a source of alternating current in which the rectifiers are not required to withstand an open circuit voltage sufficient to start the device and in which the starting impulses are automatically terminated once the device has started.

While I have shown and described a particular embodiment of this invention, further modifications and improvements will occur to those skilled in the art. I desire that it be understood therefore that this invention is not limited to the particular form shown and I intend in the appended claims to cover all modifications which do not depart from the spirit and scope of this invention.

What I claim as new and desire to secure by Letters Patent of the United States is:

1. A circuit for starting and operating an arc-discharge device on direct current from a source of alternating current comprising: an alternating current input circuit adapted to be connected to a source of alternating current; a direct current output circuit adapted to be connected to an arc-discharge device; rectifying means connected in circuit between said input and output circuits for supplying direct current for operating said device; filtering means including a main winding of a linear inductor connected in circuit with the output of said rectifying means; impedance means connected in circuit between said rectifying means and said input circuit for ballasting said device during operation, said input terminals being arranged so that the open circuit voltage across the input of said rectifying means is higher than the operating voltage and lower than the starting voltage of said device; and a non-linear resonant circuit including capacitance, and the winding of a saturating inductor and an auxiliary winding on said linear inductor connected in circuit with said input of said rectifying means, said saturating inductor being arranged to saturate at said open circuit voltage thereby drawing a highly peaked alternating current through said auxiliary winding of said linear inductor so that a peaked alternating current voltage is induced across said main winding and superimposed on the direct current voltage output of said rectifying means whereby an elevated voltage for starting said device is provided, said saturating inductor being arranged to be unsaturated at the voltage across the input of said rectifying means after said device has started thereby drawing minimum alternating current through said auxiliary winding whereby said device operates on the direct current voltage output of said rectifying means.

2. A circuit for starting and operating an arc-discharge device on direct current from a source of alternating current comprising: an alternating current input circuit adapted to be connected to a source of alternating current; a direct current output circuit adapted to be connected to an arc-discharge device; a high reactance transformer having its primary winding connected across said input circuit and having an open circuit secondary output voltage higher than the operating voltage and lower than the starting voltage of said device; rectifying means connected in circuit between the output of said transformer and said output circuit for supplying direct current for operating said device; filtering means including a main winding of a linear inductor connected in circuit with the output of said rectifying means; and a non-linear resonant circuit including capacitance, and the winding of a saturating inductor and an auxiliary winding on said linear inductor connected in circuit with said transformer output, said saturating inductor being arranged to saturate at said transformer open circuit secondary voltage thereby drawing a highly peaked alternating current through said auxiliary winding of said linear inductor so that a peaked alternating current voltage is induced across said main winding and superimposed on the direct current voltage output of said rectifying means whereby an elevated voltage for starting said device is provided, said saturating inductor being arranged to be unsaturated at the voltage across said transformer output after said device has started thereby drawing a minimum alternating current through said auxiliary winding whereby said device operates on the direct current voltage output of said rectifying means.

3. A circuit for starting and operating an arc-discharge device on direct current from a source of alternating current comprising: an alternating current input circuit adapted to be connected to a source of alternating current; a direct current output circuit adapted to be connected to an arc-discharge device; a high reactance transformer having its primary winding connected across said input circuit and having an open circuit secondary output voltage higher than the operating voltage and lower than the starting voltage of said device; rectifying means connected in circuit between the output of said transformer and said output circuit for supplying direct current for operating said device; filtering means including a main winding of a linear inductor connected in circuit with the output of said rectifying means; and a non-linear resonant circuit including a capacitor connected across said transformer output, and the winding of a saturating inductor and an auxiliary winding on said linear inductor connected in series across said transformer output, said saturating inductor being arranged to saturate at said transformer open circuit secondary voltage thereby drawing a highly peaked alternating current through said auxiliary winding of said linear inductor so that a peaked alternating current voltage is induced across said main winding and superimposed on the direct current voltage output of said rectifying means whereby an elevated voltage for starting said device is provided, said saturating inductor being arranged to be unsaturated at the voltage across said transformer output after said device has started thereby drawing minimum alternating current through said auxiliary winding whereby said device operates on the direct current voltage output of said rectifying means.

4. A circuit for starting and operating an arc-discharge device on direct current from a source of alternating current comprising: an alternating current input circuit adapted to be connected to a source of alternating current; a direct current output circuit adapted to be connected to an arc-discharge device; a high reactance transformer having its primary winding connected across said input circuit and having an open circuit output voltage higher than the operating voltage and lower than the starting voltage of said device; full wave rectifying means having its input connected to the output of said transformer and having its output connected to said output circuit for supplying direct current for operating said device; a filter circuit including a main winding of a linear inductor connected in series with said output circuit and a capacitor connected across said output circuit; and a non-linear resonant circuit including the winding of a saturating inductor and an auxiliary winding on said linear inductor connected in circuit with said transformer output, said saturating inductor being arranged to saturate at said transformer open circuit secondary voltage thereby drawing a highly peaked alternating current through said auxiliary winding of said linear inductor so that a peaked alternating current voltage is induced across main winding and superimposed on the direct current voltage output of said rectifying means whereby an elevated voltage for starting said device is provided, said saturating inductor being arranged to be unsaturated at the voltage across said transformer output after said device has started thereby drawing minimum alternating current through said auxiliary winding whereby said device operates on the direct current voltage output of said rectifying means.

5. A circuit for starting and operating an arc-discharge device on direct current from a source of alternating current comprising: an alternating current input circuit adapted to be connected to a source of alternating current; a direct current output circuit adapted to be connected to an arc-discharge device; a high reactance transformer having its primary winding connected across said input circuit and having an open circuit secondary output voltage higher than the operating voltage and lower than the starting voltage of said device; a bridge rectifier having its input corners connected to the output of said transformer and having its output corners connected to said output circuit for supplying direct current for operating said device; a filter circuit including a main winding of a linear inductor connected in series with said output circuit and a capacitor connected across said output circuit; and a non-linear resonant circuit including a capacitor connected across said transformer output, and the winding of a saturating inductor and an auxiliary winding on said linear inductor connected in series across said transformer output, said saturating inductor being arranged to saturate at said transformer open circuit secondary voltage thereby drawing a highly peaked alternating current through said auxiliary winding of said linear inductor so that a peaked alternating current voltage is induced across said main winding and superimposed on the direct current voltage output of said rectifying means whereby an elevated voltage for starting said device is provided, said saturating inductor being arranged to be unsaturated at the voltage across said transformer output after said device has started thereby drawing minimum alternating current through said auxiliary winding whereby said device operates on the direct current voltage output of said rectifying means.

No references cited.